(No Model.)  2 Sheets—Sheet 1.

M. RYAN.
ANTI FRICTION AXLE.

No. 378,978. Patented Mar. 6, 1888.

Witnesses:
J. P. Theo Lang
Robt S. Fenwick

Inventor:
Matthew Ryan
by
Mason, Fenwick & Lawrence
his Atty's (No Model.) 2 Sheets—Sheet 2.

M. RYAN.
ANTI FRICTION AXLE.

No. 378,978. Patented Mar. 6, 1888.

Witnesses:
J. P. Theo Lang.
Robt. L. Fenwick.

Inventor:
Matthew Ryan,
by
Mason, Fenwick & Lawrence
his attys.

UNITED STATES PATENT OFFICE.

MATTHEW RYAN, OF WASHINGTON, DISTRICT OF COLUMBIA.

ANTI-FRICTION AXLE.

SPECIFICATION forming part of Letters Patent No. 378,978, dated March 6, 1888.

Application filed October 25, 1887. Serial No. 253,287. (No model.)

*To all whom it may concern:*

Be it known that I, MATTHEW RYAN, a citizen of the United States, residing at Washington, in the District of Columbia, have invented certain new and useful Improvements in Anti-Friction Axles; and I do hereby declare the following to be a full, clear, and exact description of the invention, such as will enable others skilled in the art to which it appertains to make and use the same.

My invention relates to vehicle-axles and mill-shafting; and it consists in providing said axles or shafting with journal-bearing surfaces formed of anti-friction rings which loosely encircle the ends of the axles or shafts and are made to abut against an inner shoulder, adjoin one another loosely, so as to revolve freely, and kept in proper working position by means of said inner shoulder and a nut, linchpin, or other suitable device forming an outer shoulder or stop, the rings of said bearing-surface being constructed so as to be readily lubricated and to be kept so in the most effective and inexpensive manner.

By my invention an axle or journal bearing surface is formed which accommodates itself along its length at different points or over its entire surface to the unequal wear or to the varying torsional strains or resistances it meets with in its revolution by reason of its rings rolling around, either together, separately, or in different sets or series, concentrically on the axle, and thereby preserving at all times the circular form of the journal along its entire length until worn out, while the friction due to the irregular or changing movements of the journal-bearing surface—especially in turning curves—is transferred to said anti-friction rings, and the same greatly reduced, thus affording great ease to the journal and insuring increased durability to the wearing-surfaces in contact with one another.

Figure 1:
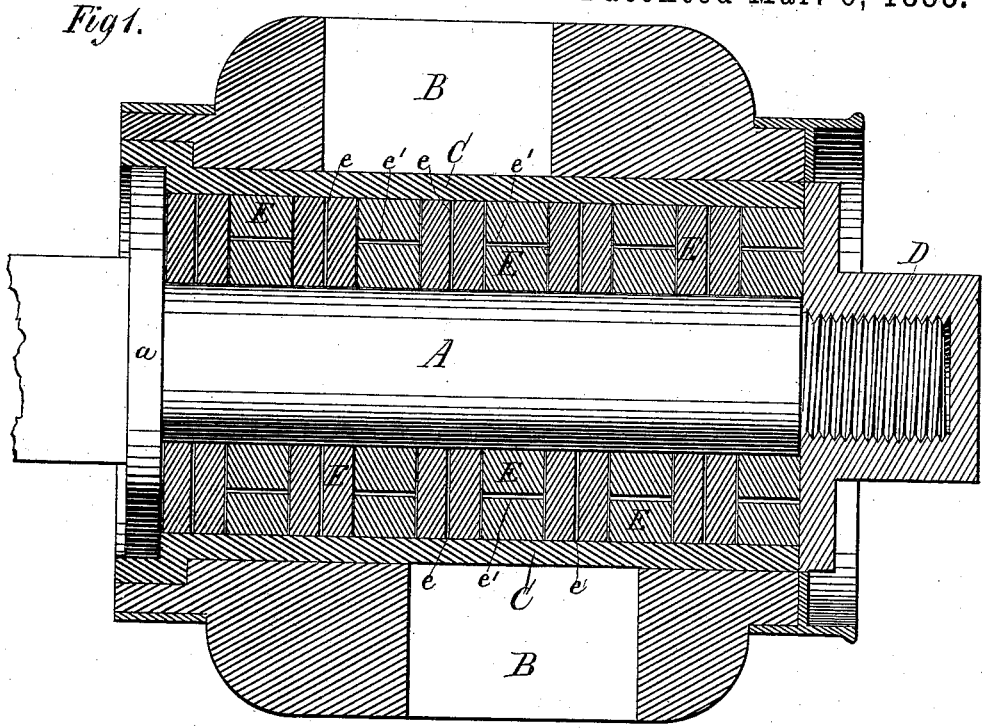
Figure 2:
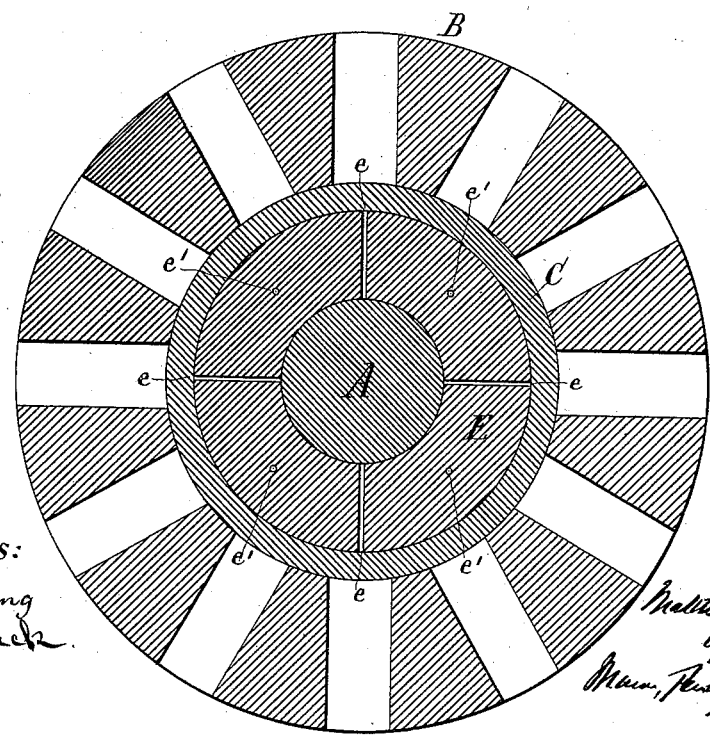
Figure 3:
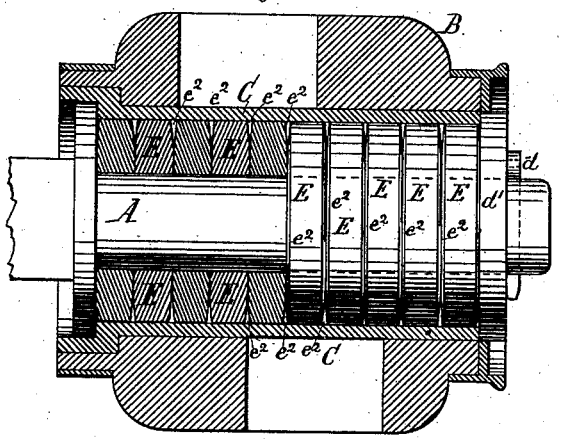
Figure 4:
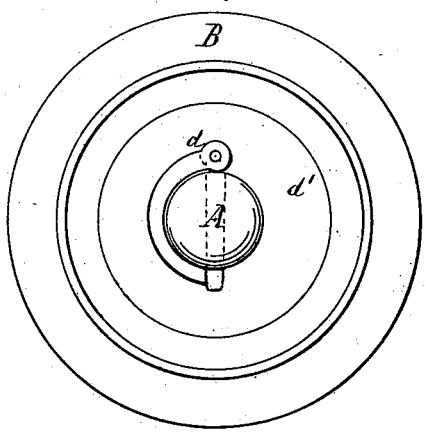
Figure 5:
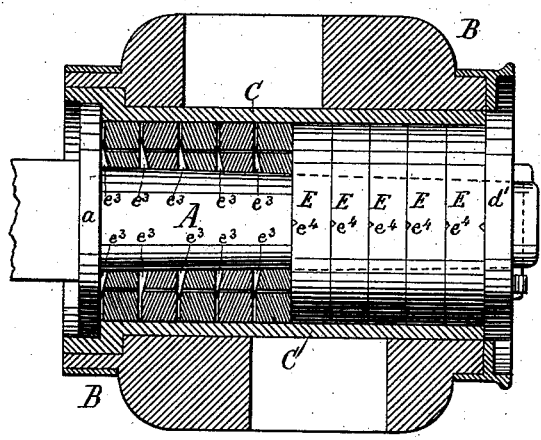
Figure 6:
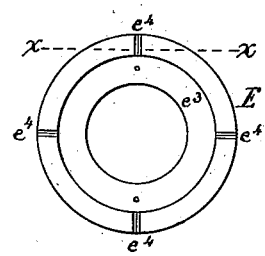
Figure 7:
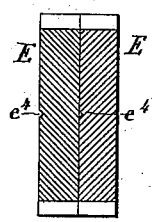

In the accompanying drawings, Figure 1 is a side elevation of the spindle portion of an axle and a central longitudinal section of the wheel-hub, screw-nut, and my anti-friction device. Fig. 2 is a transverse section of the same. Fig. 3 is a modified construction of Fig. 1. Fig. 4 is an end view of Fig. 3. Fig. 5 is another modification of Fig. 1. Fig. 6 is a face view of one of the anti-friction rings shown in Fig. 5, and Fig. 7 is a section through two of said anti-friction rings in the line $xx$ of Fig. 6.

The letter A in the drawings represents an axle-spindle; B, a wheel-hub; C, hub-box; D, spindle-nut, and E anti-friction rings.

The axle-spindle A (shown in Fig. 1) is cylindrical, and is provided with an ordinary shoulder, $a$, and nut D. Upon this spindle a number of rings, E, are fitted and held laterally between the shoulder $a$ and nut D in such manner as to allow free and easy movement and access of lubricating material. These rings are all of the same diameter and fit snugly the box C of the wheel-hub B, which box is held in place in the usual manner between the nut D and shoulder $a$ of the axle-spindle, as shown. The rings E may be provided with radial oil-holes $e$, extending from the outer to the inner periphery of each ring, or with holes $e'$, running parallel with the spindle-axis. By means of the holes $ee'$ the lubricant is conducted from the outer to the inner cylindrical bearing-surfaces and from one ring to another, and between their faces, thus making the lubrication very perfect and effective. Another means for introducing lubricating material between the rings is shown in Fig. 3, in which the anti-friction rings E are provided with chamfered or beveled sides $e^2$, whereby flaring annular spaces are formed between the rings, in which the lubricating material is collected, and from whence it is easily distributed along the several bearing-surfaces.

In Figs. 5 and 6 I have shown another modification of the means for introducing the lubricating material, consisting of annular depressions or cavities $e^3$, formed in the faces of the anti-friction rings, and radial gutters $e^4$, leading from said cavities to the outer bearing-surfaces of the rings. In this construction I have shown the usual conical axle-spindle of a carriage with my invention applied thereto, this being done by simply constructing the eyes of the rings to conform to the taper of said spindle.

My invention will prove of great benefit in other applications than those mentioned, as it is adapted for axles of street and railroad cars, for instead of using a divided railroad-car axle it is only necessary to provide one end of the undivided axle with my anti-friction device and a loose wheel, leaving the wheel at the other end fast. A car provided with axles and wheels of this construction will turn curves with greater ease and without injurious jar and unpleasant noise, and with very little friction between the wheels and the rails.

In Figs. 3 and 4 I have shown a linchpin, $d$, and a stout washer, $d'$, in place of screw and nut shown in Fig. 1, whereby the anti-friction rings and the wheel-hub are kept in place. This construction would be especially applicable for gun-carriages and heavy wagons.

I contemplate making the wearing surfaces or peripheries of the rings to conform to either a cylindrical or conical wearing box or eye. I also contemplate in cases of metal wheels to have rings come directly in contact with the wearing-surface of the eyes of such wheels, or to be fitted with bushings, as may be deemed most desirable.

In carrying my invention into practical use the following proportions, or about the same, of the parts may be adopted: For an axle-spindle, say, of, for example, one foot in length, either twelve rings each one inch in breadth of periphery or eight rings each one inch and a half in breadth of periphery may be adopted. For carriages the breadth of one inch would generally be sufficiently enduring and the best, while in the case of ordinary wagons the breadth of one inch and a half would generally be the best and sufficiently enduring. There must be sufficient breadth of periphery as well as thickness to prevent crushing of the anti-friction rings under heavy loads. For an axle-spindle or journal end of a shaft of, say, for example, three-quarters of an inch diameter, the diameter of the rings, respectively, may be equal to three times the diameter of the axle-spindle or journal end of a shaft, or the diameter of the respective rings may be equal to two times the diameter of the axle-spindle or journal end of a shaft. These proportions of an axle-spindle and journal end of a shaft may be somewhat varied; but it is essential that the proportions of the rings beyond the axle-spindle or journal end of the shaft shall be sufficient to give them the requisite sustaining-power against breaking down or crushing under the load brought to bear upon them. I prefer to have the amount of projection above referred to less than the diameter of the axle-spindle or journal end of the shaft, and regard three-fourths of the axle-spindle or journal end of the shaft as being about the best and safest amount of projection of the rings beyond said axle-spindle or journal end of the shaft both in their use for heavy and light loads. The rings, respectively, should be in diameter and breadth of periphery of about the proportions stated relatively to the length and diameter of the axle-spindle or journal end of the shaft, and hence numerous, and they should adjoin one another and have provision made for lubricating them on their inner and outer circular bearing-surfaces, and also on their adjoining faces. The means I have shown for lubricating the rings and the mode of applying them between collars or shoulders and in close bearing relation to one another afford a mutual aid of one ring to another, as well as perfect lubrication of all the rings on all their bearing or contact surfaces, while the rings are allowed freedom to move on the axle-spindle or journal end of the shaft either separately, in series, or in a collective body.

I make no claim for separated and spaced rings in combination with a grooved axle-thimble, as shown in Letters Patent No. 243,974, nor for two layers of short sleeves arranged to break joints, as shown in Letters Patent No. 215,188; but

What I claim as my invention is—

1. An axle or shaft having a spindle or journal bearing surface consisting of a single layer of closely-adjoining anti-friction rings slipped loosely upon the axle-spindle or the journal end of the shaft, and proportioned, respectively, in diameter and breadth of periphery relatively to the length and diameter of the axle-spindle or journal end of the shaft, and arranged to have a wearing contact against the wheel eye, hub, or journal-box, substantially as and for the purpose described.

2. The anti-friction rings E, arranged in a single layer, and proportioned, respectively, in diameter and breadth of periphery relatively to the length and diameter of the axle-spindle or journal end of the shaft, and slipped upon an axle-spindle or journal end of the shaft, made to adjoin one another, and held laterally in position between inner and outer shoulders or stops, in combination with the wearing-surface of a wheel eye, hub, or journal-box, substantially as and for the purpose described.

3. An axle or shaft having a spindle or journal bearing surface formed of a single layer of closely-adjoining anti-friction rings which have depressions in their faces and are slipped upon the axle-spindle or journal end of the shaft, and proportioned, respectively, in diameter and breadth of periphery relatively to the length and diameter of the axle-spindle or journal end of shaft, substantially as and for the purpose described.

4. An axle-spindle or shaft having a journal-bearing surface formed of a single layer of closely-adjoining anti-friction rings provided with passages for the circulation of lubricating material, said rings being slipped upon the axle-spindle or journal end of the shaft, and proportioned, respectively, in diameter and breadth of periphery relatively to the length and diameter of the axle-spindle or journal end of the shaft, substantially as and for the purpose described.

5. An axle or shaft having a journal-bearing surface formed of anti-friction rings which are beveled on their faces, said rings being slipped on a spindle or journal, substantially as described.

In testimony whereof I affix my signature in presence of two witnesses.

MATTHEW RYAN.

Witnesses:
ROBT. S. FENWICK,
J. P. THEO. LANG.